United States Patent
Vogel

[11] Patent Number: 5,453,015
[45] Date of Patent: Sep. 26, 1995

[54] AUDIENCE RESPONSE SYSTEM AND METHOD

[76] Inventor: Peter S. Vogel, 28 Adeline Street, Faulconbridge N.S.W. 2776, Australia

[21] Appl. No.: 684,894
[22] PCT Filed: Oct. 20, 1989
[86] PCT No.: PCT/AU89/00457
  § 371 Date: May 29, 1992
  § 102(e) Date: May 29, 1992
[87] PCT Pub. No.: WO90/04439
  PCT Pub. Date: May 3, 1990

[30] Foreign Application Priority Data

Oct. 20, 1988 [AU] Australia .................. PJ1083

[51] Int. Cl.$^6$ .................................... G09B 3/00
[52] U.S. Cl. ............... 434/350; 434/307 R; 434/323; 434/362; 364/419.2; 348/2; 455/2; 379/96
[58] Field of Search ................. 434/118, 169, 434/185, 219, 234, 236–238, 258, 307, 308, 322, 323, 324, 350, 362, 307 R; 379/96, 105; 364/409, 419.2; 455/2; 348/61, 1–3, 13, 16

[56] References Cited

U.S. PATENT DOCUMENTS

| | | |
|---|---|---|
| 3,718,759 | 2/1973 | Reiffel . |
| 3,771,240 | 11/1973 | Matui . |
| 3,934,226 | 1/1976 | Stove et al. ................ 434/308 X |
| 4,121,355 | 10/1978 | Kimoto et al. ................ 434/308 |
| 4,122,498 | 10/1978 | Dyer . |
| 4,377,870 | 3/1983 | Anderson et al. . |
| 4,518,361 | 5/1985 | Conway ................ 434/350 X |
| 4,651,299 | 3/1987 | Miyazaki et al. ................ 434/350 X |
| 4,745,468 | 5/1988 | Von Kohorn . |
| 4,926,255 | 5/1990 | Von Kohorn ................ 434/323 X |
| 5,033,969 | 7/1991 | Kamimura ................ 434/307 X |
| 5,176,520 | 1/1993 | Hamilton ................ 434/323 X |
| 5,211,564 | 5/1993 | Martinez et al. ................ 434/322 X |
| 5,273,437 | 12/1993 | Caldwell et al. ................ 434/350 X |
| 5,294,229 | 3/1994 | Hartzell et al. ................ 434/322 X |

FOREIGN PATENT DOCUMENTS

| | | |
|---|---|---|
| 0010794 | 5/1980 | European Pat. Off. . |
| 0214315 | 3/1987 | European Pat. Off. . |
| 2520180 | 7/1983 | France . |
| 2148675 | 5/1985 | United Kingdom . |
| 2184029 | 6/1987 | United Kingdom . |
| 8602753 | 5/1986 | WIPO . |
| 8607277 | 12/1986 | WIPO . |

OTHER PUBLICATIONS

Patent Abstracts of Japan, vol. 008198, Sep. 1984.

*Primary Examiner*—Joe H. Cheng

[57] ABSTRACT

A system is provided for recording and evaluating audience responses, for example, answers given to questions posed in television quiz shows. Responses are sensed using, for example, a membrane switch array, and timing information is generated by a timer. Data identifying responses and associated timing information is stored in a memory for later recall. When the responses are recalled, the associated timing information can be used to verify that a quiz-show participant made the response within the time period allowed according to the rules of the quiz.

43 Claims, 8 Drawing Sheets

| QUESTION 1 | QUESTION 2 | QUESTION 3 | QUESTION 4 | QUESTION 5 |
| --- | --- | --- | --- | --- |
| QUESTION 6 | QUESTION 7 | QUESTION 8 | QUESTION 9 | QUESTION 10 |
| QUESTION 11 | QUESTION 12 | QUESTION 13 | QUESTION 14 | QUESTION 15 |
| QUESTION 16 | QUESTION 17 | QUESTION 18 | QUESTION 19 | QUESTION 20 |

AUDIENCE RESPONSE SYSTEM AND METHOD

TECHNICAL FIELD

The present invention relates to methods of, and means for recording and collecting responses of audiences to events being experienced.

BACKGROUND ART

Audience response gathering systems provide schemes for gathering and analysing responses by individual members of an audience. An example of such an application is a quiz show or contest where questions are asked, and players in the audience must respond by answering the questions. In most such contests players are required to answer within a specified time. Another example is a competition whereby the spectators of a sporting event predict the course of play, for example by responding at the end of each over of a cricket match by estimating the number of runs the next batsman will score.

The audience from which responses are gathered need not be located at the site of the event. For example, the audience could be a television audience spread over a whole country, or even world-wide. In the case of television audiences, the participation of viewers has to date been mostly limited to passive observation. To make the medium more effective, entertaining and educational, it has been observed that it is desirable to provide the opportunity for viewers to respond actively to programmes. Some attempts have been made to provide such interaction, but with only minimal success. The simplest means of viewer participation is by mail or telephone response, for example by inviting viewers to write letters or to phone specified numbers to register their opinion such as when voting for parties of a political debate. While these methods are simple and inexpensive, they lack immediacy, limiting their usefulness and appeal. For example, in the case of quiz shows it may be desirable to allow viewers to compete. To achieve this effectively, viewers' responses must preferably be recorded in such a way that the time taken to respond can be taken into account in judging the winner. Postal response is not suited for this as it is easy for competitors to cheat by recording the programme and researching questions at their leisure. Telephone response is more immediate but can cater for only a limited number of players. A number of interactive television systems have been proposed for allowing immediate response using communications from viewers' homes to central recording stations. Such systems suffer the limitation that the viewer's terminal, the communication system and recording stations must be complex and expensive. Another limitation inherent to such systems is that the number of simultaneous participants is limited by the bandwidth of the communications channel or other related technical constraints. Given that television audiences typically number many millions, only a small percentage can be accommodated using these techniques. These factors have severely limited the implementation of interactive television. Attempts have been made to provide systems of viewer response which do not require a return communication channel. One such system, described in U.S. Pat. No. 4,745,468 of Von Kohorn, uses a response comparator which receives response criteria from a broadcast signal and compares it to responses entered by a viewer at a keyboard. If the responses are correct, a card dispenser at the receiving station issues a card which can be used as a discount token, redeemed as cash or as some other form of reward. While this system is useful in some applications, viewers can cheat, for example by using a device capable of delaying the response criteria signal being received at the receiving station, thus allowing a greater time period in which to respond to questions. In cases where it is desired to collect scores at a central station, Von Kohorn's system uses printed cards or magnetic cards dispensed at the viewer's home as the score recording means. The apparatus required for this purpose is complex and expensive.

A further limitation of Von Kohorn's proposal is that if a keyboard is used for entering responses, a degree of special skill on the part of the user is required, which mitigates against fast responses in cases where free-form or unprompted responses are called for. This limitation has to date adversely influenced consumer acceptance of audience response systems which rely on keyboard entry of responses, including interactive television systems using bi-directional realtime communication. Von Kohorn suggests certain other forms of input device which could be used instead of the keyboard, but these are more complex and expensive.

Other proposed systems use information within the picture content of a television programme to transmit timing information to the viewer playing apparatus. One such system s described in Australian patent specification 59694/86, in which Drummond claims an invention which accepts a modulated optical signal from a predetermined point on a television screen as one input to an event adjudicator and an actuator which accepts a response from a viewer as a second input to the event adjudicator. The event adjudicator is arranged to determine which of the events occurs first, so that viewers can compete in competitions which require a response to be given before a signal is received from the broadcasting station. While this system does allow viewer participation to a limited degree, it is not well suited to competitions involving prizes, as it is possible for viewers to cheat, for example by recording the quiz show on video tape, researching the answers, and then replaying it at a later date, using Drummond's event adjudicator to record the results.

In the case of other types of audiences, such as the spectators of sporting events referred to above, gathering responses has been limited to predictions of play, generally written, before events start, such as betting on the outcome of a horse race, or estimating the margin by which one team will defeat the other. Although it is desirable to allow spectator interaction during the course of the event, such as predicting during the game the number of runs each player will score, systems for achieving this have been complex and expensive, and have as a result not been commercially successful.

DISCLOSURE OF INVENTION

The present invention is directed to providing novel and useful means and method of recording and collecting audience response which does not require the installation of expensive equipment, can provide for an unlimited number of participating viewers, enables timing of responses to be a determining factor in the assessment of responses and minimises the possibility of cheating.

According to a first aspect of the invention there is provided a method of audience response recording and collecting comprising the steps of accepting from each of a plurality of members of an audience a plurality of actions, each action corresponding to a specific response, storing response signals representative of each said action, storing for each said signal associated timing information, and on completion of recording of a prescribed number of responses, recalling said response signals and timing information, comparing each stored response signal to a signal representative of a preferred response, calculating a result value according to the result of the comparison, comparing the recalled timing information to a predetermined range of time values to determine whether a response was made within a defined period of time and indicating, according to the result of said comparison, whether the response is valid. The term "preferred response" use herein refers to a particular response or set of responses of particular relevance to a particular audience response gathering application. For example in the case of application to a game show, the preferred responses are the correct answers to questions, although it is to be understood that the invention is also suited to applications in which responses need not be classified as correct or incorrect. According to this aspect of the invention, the defined period of time to which the recalled timing information is compared generally refers to the period in which the response from the audience is considered valid; in the case of a game show this would be a short period following the posing of a question.

The actions accepted from members of the audience referred to herein may be any kind of human response, such as applying pressure to a surface using a pen, pushing a button, moving a lever, or uttering a sound. One aspect of the invention provides a system whereby members of an audience can respond by writing their response freehand, the invention being adapted to record continuously the co-ordinates of a writing implement as it is moved over a suitable sensor surface, such as an X-Y tablet. According to this aspect of the invention, timing information is stored with associated coordinate information, so that a written response can be subsequently recalled along with corresponding timing information.

According to a further aspect of the invention there is provided a method of audience response recording and collecting according to the first aspect described above, wherein the step of recalling the response signals and timing information comprises the sub-steps of recalling, for each stored response signal, timing information represented by a number of clock units, each clock unit representing a time interval determined by a frequency of oscillation, measuring said frequency of oscillation, calculating from the recalled timing information and frequency of oscillation an elapsed time, and calculating from the elapsed time the time at which each response signal was stored. The calculated time is preferably calculated as an absolute time, that is, as time of day and date, and is preferably compared to the time and date at which the event to which the audience responded took place. This aspect of the invention provides a number of important benefits over prior-art timing schemes. In particular, the absolute accuracy of the frequency of oscillation from which timing information is derived is not important, so that no calibration of frequency is required prior to sale, with the result that manufacturing cost of devices using such timing means is reduced. The technique also obviates the need to establish an absolute time prior to use, simplifying operation for the user and eliminating the possibility of a user cheating by setting an incorrect time.

According to a further aspect of the invention there is provided audience response means comprising sensor means adapted to accept from a member of an audience a plurality of response actions; memory means, timer means and controller means adapted to store in said memory means response signals corresponding to each said response action and to store in said memory means timing information related to the time at which each said response action occurred; and interface means adapted to recall said stored response signals and timing information. Preferably, such apparatus can be constructed in the form of a portable device so that the accepting of responses can take place at a first location and the recalling of the information at a second remote location.

According to a further aspect of the invention there is provided audience response means comprising sensor means adapted to accept from a member of an audience a plurality of response actions, memory means, timer means, controller means adapted to store response signals corresponding to each said response action and timing information related to the time at which each said response action occurred in said memory means, interface means adapted to recall said stored response signals and timing information and convey them to computing means adapted to calculate the time at which responses were made. Preferably, said computing means is further adapted to accept a signal representative of the clock period from which the timing information was derived at the time of storing and to compute, using said signal as a reference, the time at which responses were made. Preferably, said computing means is further adapted to accept the response signals and calculate scores based on comparison of the recalled response signals with a set of preferred responses, this calculation being optionally influenced by the calculated time of response. The term "score" as used herein refers to the result of a comparison between the recorded response and a preferred response or any tabulation or statistical analysis of responses.

Preferably, the time of response is calculated as an absolute time, that is, time and date, so that it can be easily compared to the time and date at which the event to which the response was made occurred. For example, if the invention is used to allow a television audience to respond to a quiz show, the time and date of each response can be compared to the time and date at which the corresponding question was broadcast, to guard against cheating or to weight scores according to response speed.

According to a further aspect of the invention there is provided a method of audience response recording and collecting comprising the steps of accepting from each of a plurality of members of an audience a plurality of actions, each action corresponding to a specific response, storing response signals representative of each said action if said action occurs during one or more predetermined time windows, and on completion of recording of a predetermined number of responses, recalling said response signals and timing information. The expression "time window" refers to a period of time bounded by a minimum time and a maximum time.

According to a further aspect of the invention there is provided audience response means comprising sensor means adapted to accept from a member of an audience a plurality of response actions, memory means, timer means, controller means adapted to store response signals corresponding to each said response action in said memory means if the current timer value falls within predetermined ranges of values, and interface means adapted to recall said stored response signals and timing information. Preferably, such apparatus can be constructed in the form of a portable device so that the accepting of responses can take place at a first location and the recalling of the information at a second remote location.

A further useful feature of the invention is the provision of means and method which enables responses recorded according to any of the foregoing aspects of the invention at a plurality of playing locations to be recalled and conveyed to one or more remote collecting stations without requiring physical conveyance of the response recording means to the collecting stations, said means and method characterized by the use of a communication system to convey response data and timing information relating to said data from each of the playing stations to the collecting stations. Alternatively, response data can be conveyed to a collecting station using a coupon which is detached from the response recording means and conveyed to the collecting station by the user. The term coupon is defined herein to include any means for semi-permanent storage of data which can conveniently be detached from the response recording means. Some examples of suitable coupons include magnetic cards, printed tickets or plug-in semiconductor memory modules.

According to another novel and useful variation of the inventive concept, the sensor means for accepting response actions can comprise a number of adjacent conductive zones separated by insulating zones, a response being made by breaking the electrical continuity of a zone by removing the conductive material. For example, the sensor can comprise a paper card printed with zones of conductive ink, each zone being connected to sensing logic. When the user scratches off the ink in the zone corresponding to the desired response, the circuit is broken and the action is detected by the sensing logic.

The invention further provides simpler audience response means, being equipped substantially as described above, but adapted to receive only a small number of responses or only one response. For example, the invention also consists in audience response means equipped with a single button which a member of an audience can push at a chosen time. The invention also provides audience response means as described above in which the timing information for only some of the response actions is stored. For example, the invention can be adapted to store only the time of the last response action.

An extension of the invention further provides means for receiving timing reference signals from a remote source and means for synchronizing the timer means of the invention to this timing reference signal, thereby improving the accuracy of timing.

According to yet another aspect, the invention can be further adapted to receive scoring data signals indicating preferred responses, compare said signals to signals representative of response actions accepted from a member of an audience, and calculate a score depending on the result of the comparison. This aspect of the inventive concept can be beneficially employed if it is desired to indicate immediately to players whether they have won a game or passed a test. This aspect of the invention can be further extended to cause a prize to be issued to players, for example by printing a coupon.

The invention also consists in a game comprising stimuli to which responses are invited, an audience comprising a plurality of players possessing response recording means as described herein, means for recalling responses stored by said players, and means for calculating the time at which said recalled responses were recorded.

The invention also consists in means and method for calculating the absolute time of an event whereby the time of the event has been recorded as a number of arbitrary but constant time units as described in relation to the invention disclosed above.

The present invention will hereinafter be described with particular reference to a quiz show broadcast as a television programme, although it is to be understood that it is of general applicability. For example, the invention can be used to record spectator response at a sporting event, or to record competitor response at a game such as a quiz or a game of chance which is conducted in front of an on-location audience. The invention is well suited to a wide range of audience response applications, such as market research or gathering responses to content of television commercials and offers many advantages over the prior art. Some advantages particularly useful in the case of recording responses to television shows include the ability to provide written copy of the responses recorded, without requiring costly printing means; ability to record responses in free-text form or multiple-choice form, without the requirement that the user possess keyboard skills; ability to verify that responses were recorded within a defined time window, protecting against cheating; and low cost of manufacture of the required apparatus.

BRIEF DESCRIPTION OF DRAWINGS

The present invention will now be described by way of example with reference to the accompanying drawings in which.

MODE FOR CARRYING OUT THE INVENTION

Figure 1:
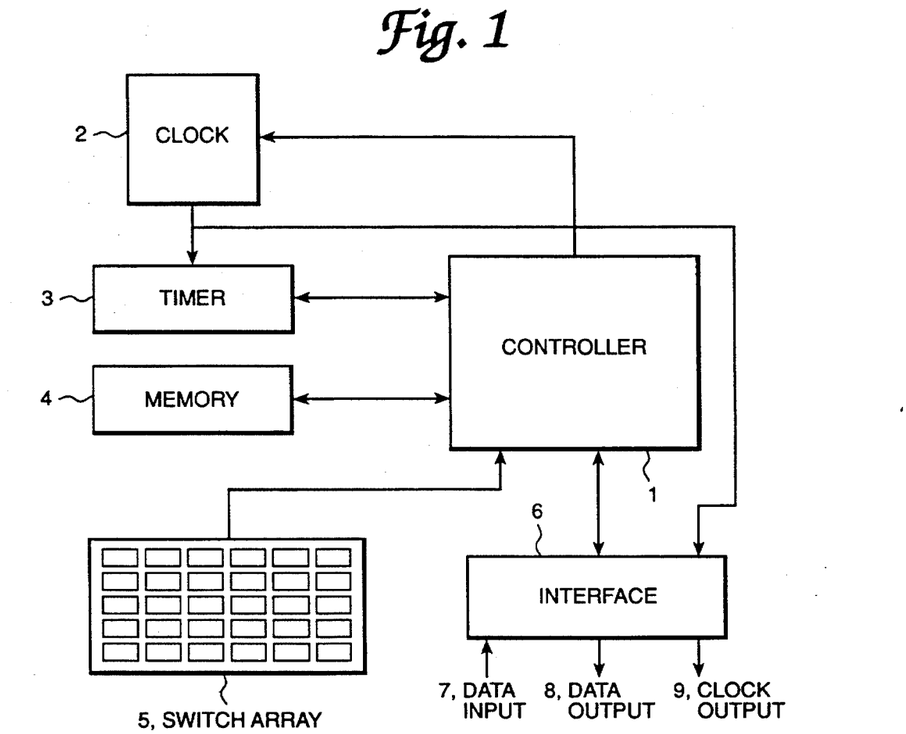
FIG. 1 is a block diagram of audience response means in accordance with the present invention, using a switch array for accepting responses.
Figure 2:
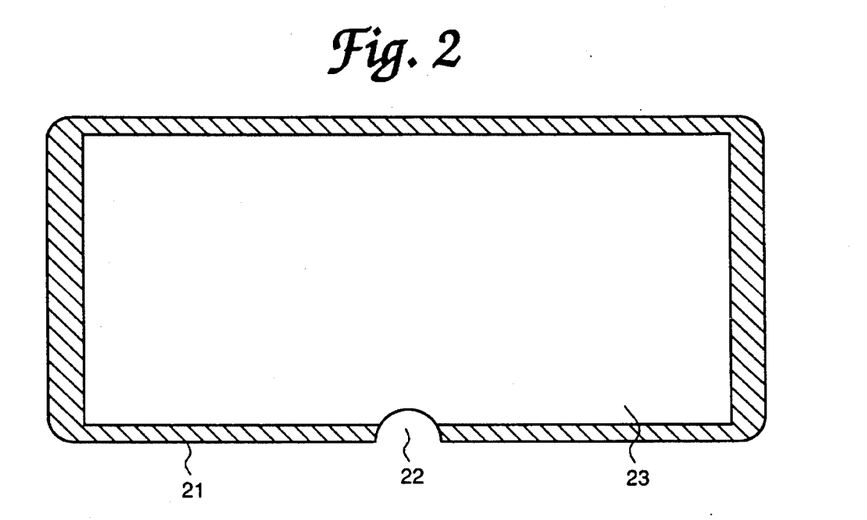
FIG. 2 illustrates a physical construction of the apparatus of FIG. 1.

Referring now to FIG. 1, there is shown a block diagram of an embodiment of the invention in which the means for accepting audience responses is a switch array, shown as switch array 5. This switch array can for convenience be constructed using the well-known membrane switch technology. Switch array 5 is physically located on, and covers most of, the upper recessed surface (23) of the apparatus, shown in FIG. 2. Referring to FIG. 2, an enclosure (21) contains the apparatus of FIG. 1 and also provides a recess into which printed response cards can conveniently be inserted. An index notch (22) provides convenient means for retrieving cards, as well as means for ensuring correct orientation of cards relative to the enclosure.

Referring again to FIG. 1, the apparatus is arranged to remain substantially dormant from the time of power being supplied, for example by inserting batteries (not shown). In this dormant state, all elements are held in a power-down or standby mode, to minimise power consumption. Clock 2 is held inhibited and consequently timer 3 does not run. Upon detection by controller 1 of a switch depression, controller 1 enables clock 2 which is in this embodiment a high-accuracy crystal oscillator. At that time the value of timer 3 is read by controller 1 and stored in memory 4. A data byte identifying which switch of switch array 5 was depressed is also written to memory 4. Subsequent switch depressions are similarly recorded along with the associated values of timer 3. In this way a list of switch numbers along with the timer value at the time of depression is constructed in memory 4. In this embodiment clock 2 includes frequency dividers and generates at its output a signal of one second period. Timer 3 comprises a 23 bit counter with latching and buffering to enable controller 1 to read the value in convenient byte-wide divisions. Using a 23 bit counter clocked at 1 Hz provides over three months duration to be timed. Memory 4 is sufficiently large to store 256 switch depressions and timings. Once all memory locations have been filled, addressing wraps around, so that earlier data is overwritten. This permits the device to be used indefinitely, the last 256 responses always being available for recall.

Interface 6 is provided to allow the contents of memory 4, the value of timer 3 and the frequency of clock 2 to be recalled and examined. To facilitate this, controller 1 is arranged to recall the contents of memory 4 and timer 3 on receipt of a predetermined signal at data input 7. For convenience, data input 7 is an asynchronous serial data input, data output 8 is an asynchronous serial data output, and clock output 9 is a continuous clock signal derived from clock 2. On receipt of a predetermined signal, controller 7 recalls each data byte of memory 4 in turn and sends corresponding data signals to data output 8. When all data has been recalled, controller 1 waits for a different predetermined signal to arrive via data input 7, at which time controller 1 causes the current value of timer 3 to be sent to data output 8.

Figure 3:
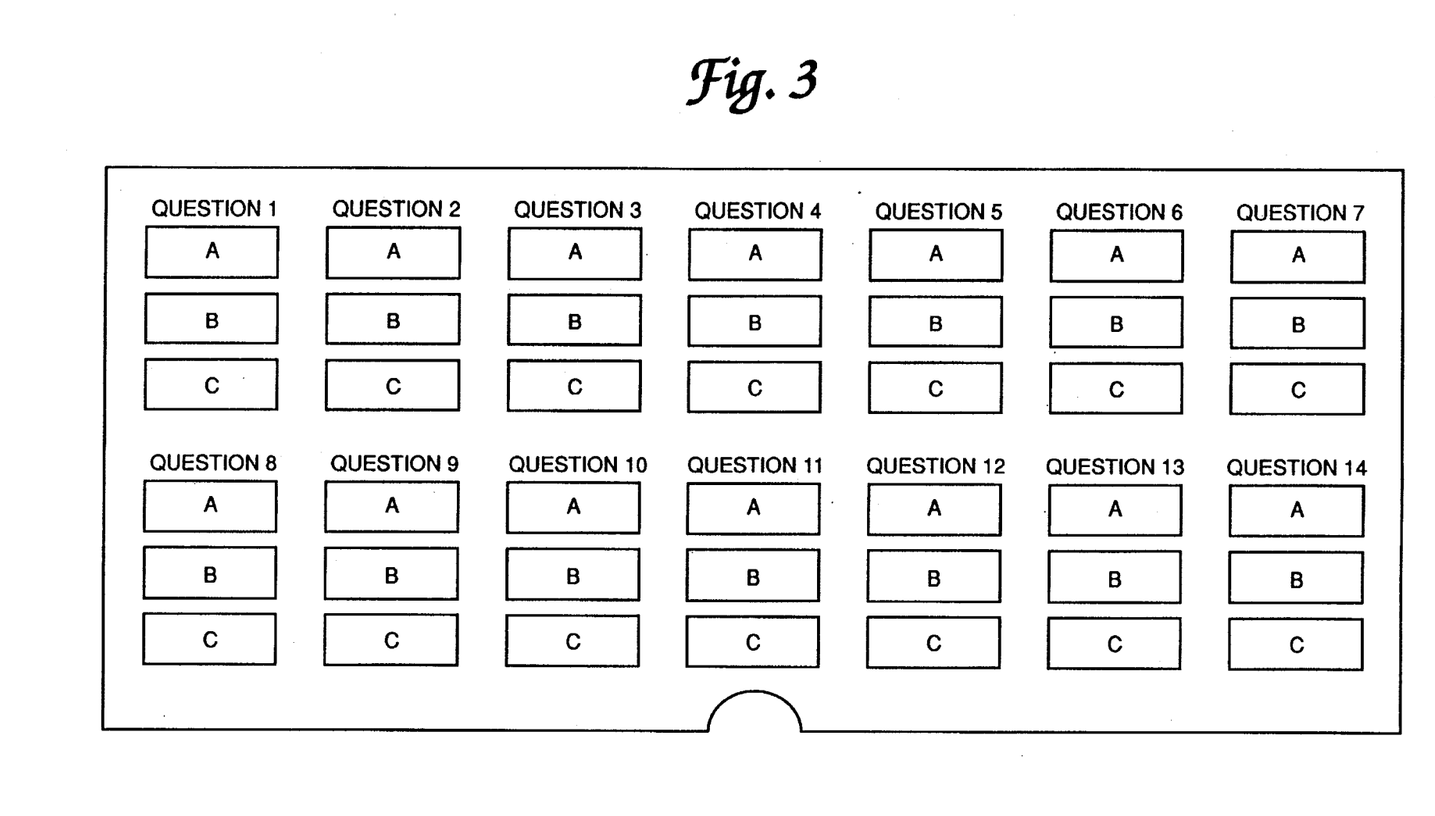
FIG. 3 illustrates an exemplary response card suitable for use with the apparatus of FIG. 1.

To illustrate the operation of this embodiment of the invention an exemplary application will now be described. According to this application, the apparatus of FIG. 1 is used to gather audience responses in the case of a television quiz show. The quiz is conducted by a presenter at the television station who directs a number of questions to viewers at home. For each question, a number of possible answers are given, in this example there are three such choices. Each viewer has previously acquired a device as described above and shown in FIGS. 1 and 2, as well as one or more response cards, as illustrated in FIG. 3. Each card is printed with boxes corresponding to the possible responses to each question (in this example 14 questions per card). In a typical quiz show, there may be 5 such cards. The viewer places the first card in the recessed surface of the device, oriented so that the index cutout aligns with the index (22) of FIG. 2 of the enclosure (21) of FIG. 2. The boxes printed on each card are arranged to align with the switches of switch array 5 of FIG. 1, so that writing on any box results in depression of a corresponding switch. When the first question is asked, each participating viewer selects one of the possible choices for the answer, and indicates such selection by marking a cross in the appropriate box. The controller is arranged so that multiple consecutive depressions of the one switch within a short time (say one second) cause only the first such depression to be recorded. When the first such response is made, the clock is enabled, and the timer begins counting seconds. Data identifying which switch was depressed, along with the timer value at that time, is stored in the memory. As each subsequent question is answered in this way, the viewer's choice, and the timer value, is stored in sequential memory locations. At the conclusion of the first 14 questions, the viewer removes the response card and inserts the next one, and so on until the game is complete. A complete game might run for several shows, for example, over a week of nightly broadcasts. At the conclusion of a game, the device is returned to a scoring station, where it is connected to a scoring computer which gathers responses and timing values, using interface 6 of FIG. 1 as described above. To ensure that players did not cheat, for example by recording the questions, researching at leisure, and entering their responses some time after the quiz show was broadcast, it is necessary to verify that the responses were recorded shortly after the questions were broadcast. As the timing values are simply the values read from timer 3 of FIG. 1 at the time each response was recorded, it is necessary to calculate the time of day and date at which each response was recorded. In this example, this is achieved by reading the current timer value from timer 3, subtracting from that value in turn the timing value of each recorded response, accurately measuring in seconds the clock period of clock 2 of FIG. 1, multiplying the clock period by the time differences to obtain a relative time in seconds, and subtracting this relative time from the current time and date to derive absolute times and dates for each response. The scoring computer can also calculate scores by comparing stored responses to a model set of responses. In this way, a winner or winners can be automatically identified, and cheating can be prevented by eliminating responses made after a predetermined time. The printed response cards used with this example of the invention can be retained by each player, as a written record, or returned with the device to the scoring station. In the latter case, scoring could be performed manually, by reading selections off the cards, the recording device being used as a means of verifying that the winner or winners so selected did not enter their responses after a predetermined time, and that the responses indicated in writing axe the same as those made at the time of the quiz broadcast. If desired, the response cards can comprise multiple sheets, being constructed for example as two-part carbonless copy forms, so that one copy could be kept by the player and the other returned for scoring. As a further option, the players can retain the recording device and return only the score cards for scoring, only winners or high scorers being required to send in their devices for verification. Alternatively, the correct answers could be published after the game, so that players could assess their own scores, returning their recording devices for verification only if they score highly. These schemes might be desirable to minimise handling or postage costs.

A number of useful variations on the above-described embodiment will now be described.

Figure 4:
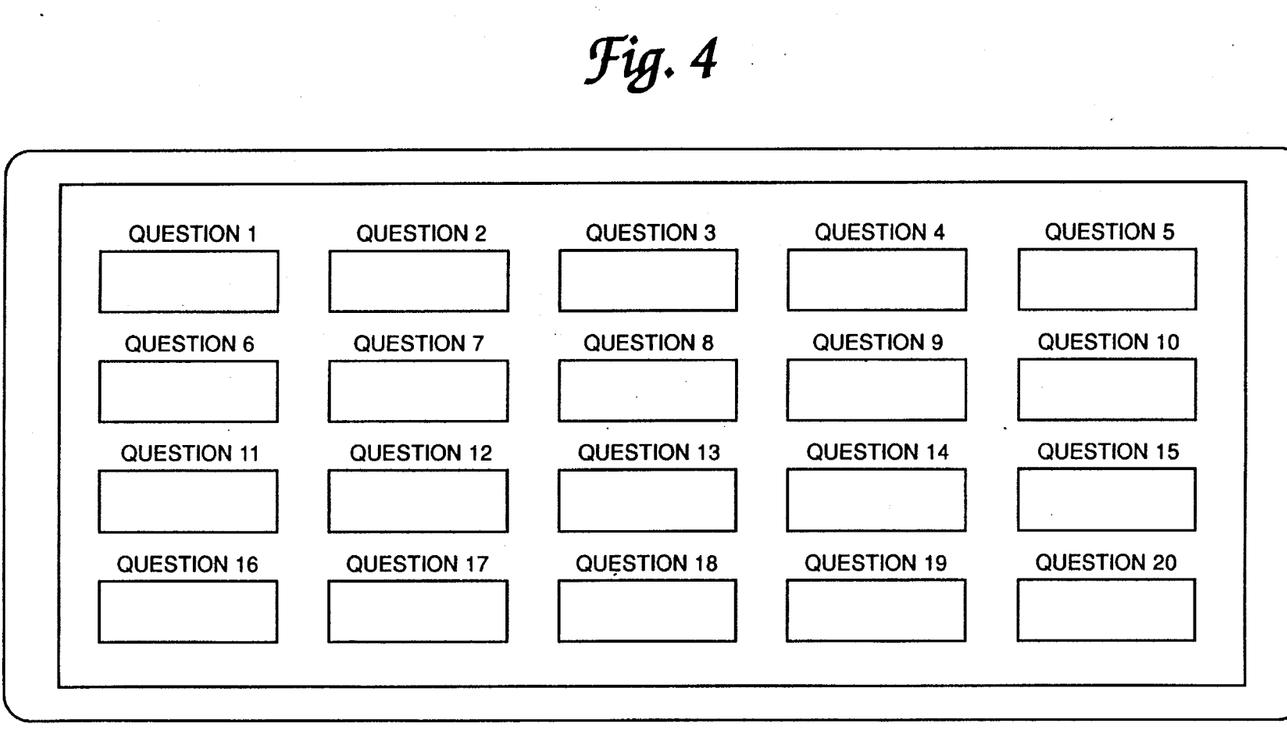
FIG. 4 illustrates a physical construction of audience response means in accordance with the present invention wherein responses are written on the surface of the apparatus.

Whereas the embodiment described above is ideally suited to use in the case of multiple-choice answers, it may be desired to use the invention for recording responses as freely-chosen words. In such circumstances an embodiment of the invention in which players write their answers freehand on the surface of the switch array is provided. An example of the construction of a suitable device is illustrated in FIG. 4. In this example, each game consists of 20 questions. The player writes answers in the spaces indicated by the boxes printed on the surface of the device, rather than on removable cards as used in the embodiment described previously herein. Electronically this embodiment of the invention is similar to that of FIG. 1, except that the switches are aligned with the boxes printed on the surface of the device. When an answer is written in a provided space, a switch underneath is activated, and the time is recorded. In this way the time at which each answer was written can be verified as described above. To prevent cheating, the surface coating onto which answers are written is selected so that it cannot be delaminated or otherwise removed. Preferably, it is also constructed in such a way as to ensure that the pressure required for writing exceeds the pressure required to activate the switches. An example of a suitable surface is a thin metal foil attached with suitable adhesive and coated with a paint suitable for writing on with a ball-point pen. If an attempt is made to cheat by pressing on the switches at the correct time, and then writing answers on some time later, the second depression, which must be forceful enough to mark the foil, will be sensed and the controller will cause the later time to be recorded. Similar results can be achieved using any writing surface which requires a significant amount of pressure to be applied for effective writing.

Figure 5:
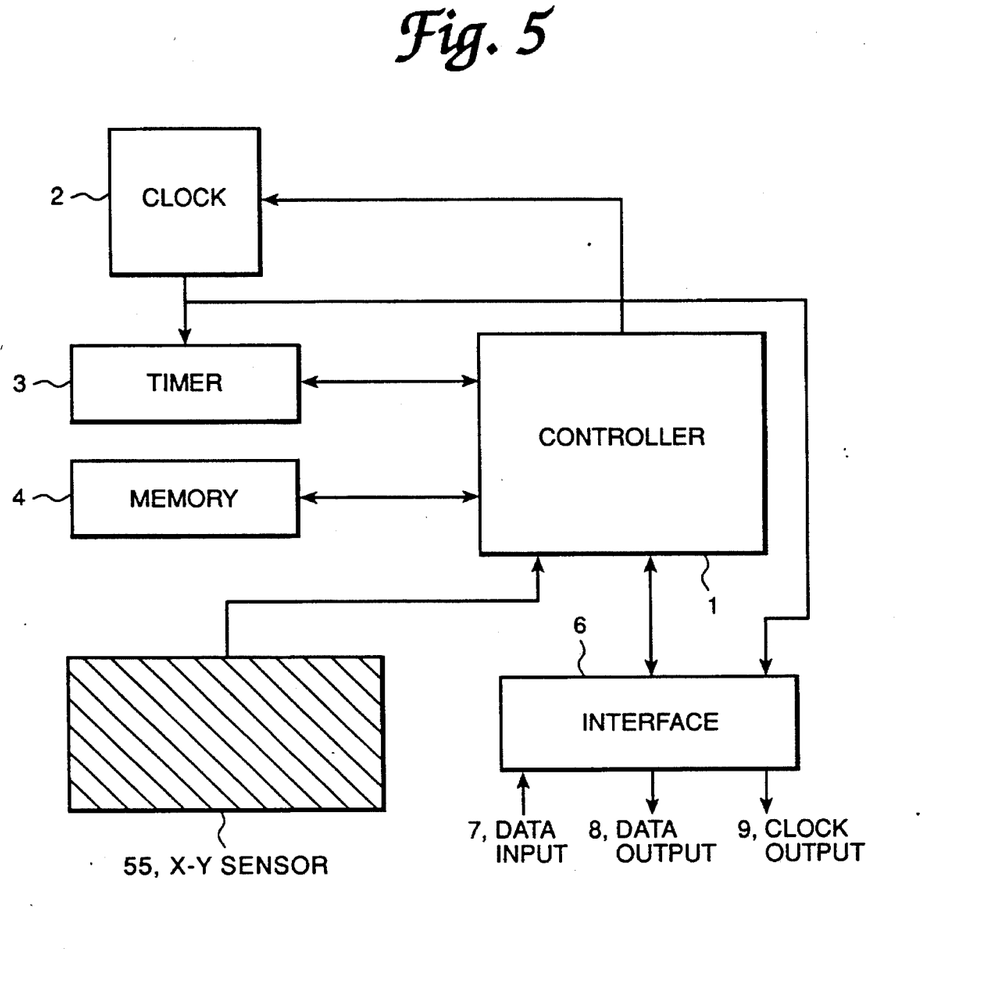
FIG. 5 is a block diagram of audience response means similar to that of FIG. 1 but using an x-y sensor for accepting responses.
Figure 6:
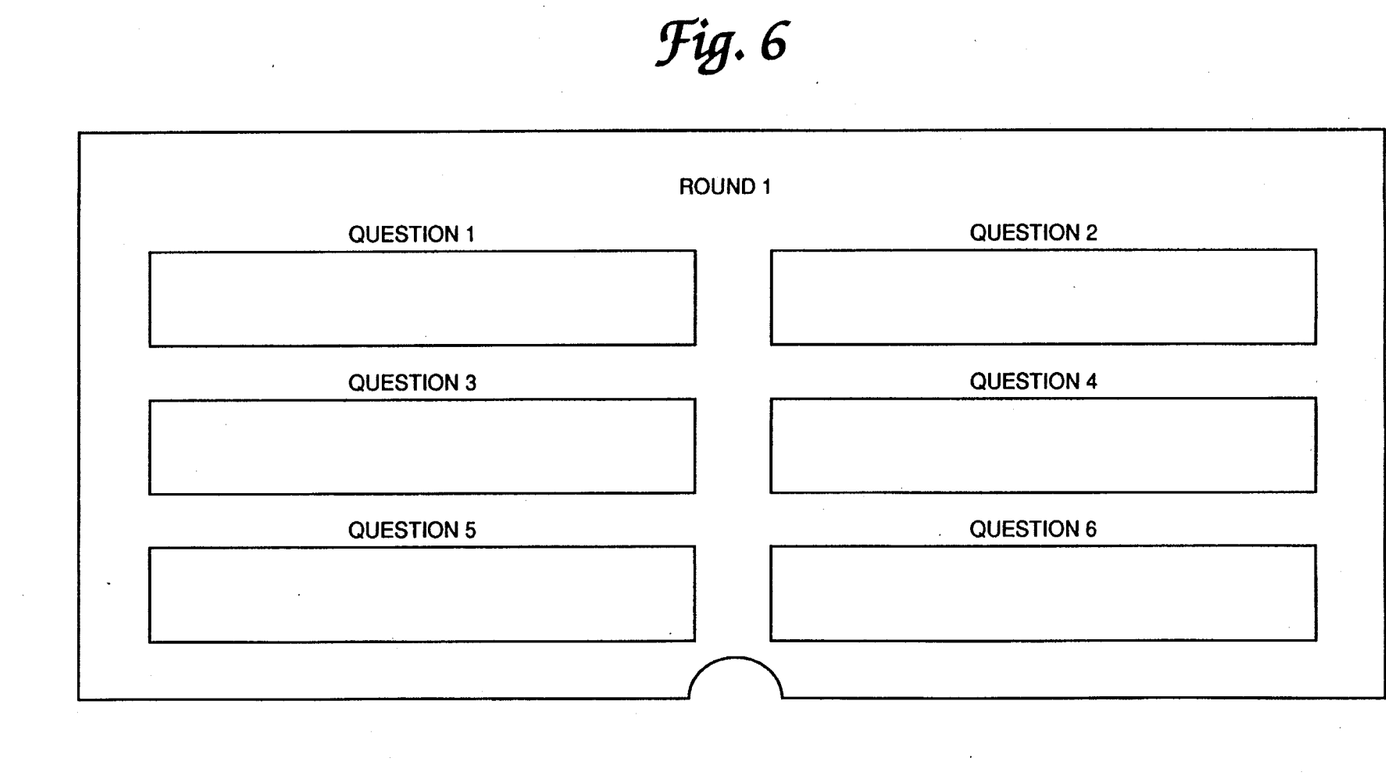
FIG. 6 illustrates an exemplary response card suitable for use with the apparatus of FIG. 5.

A further useful embodiment of the invention is shown in block diagram form in FIG. 5. As seen in FIG. 5, this embodiment is similar to that of FIG. 1, except that switch array 5 of FIG. 1 is replaced by X-Y sensor 55 in FIG. 5. X-Y sensor 55 is a two-dimensional drawing surface with electrical outputs indicating the point at which pressure is applied to it, for example by a pen while writing. The electrical outputs representing X and Y co-ordinates are accepted as input by controller 1. X-Y sensor 55 in this embodiment is a pressure-sensitive resistor assembly, as commonly used for inputting drawings to computers. Other forms of X-Y sensor, such as graphics tablets employing magnetic position sensing, can also be used with good results. Operation of this embodiment is as described for the embodiment of FIG. 1, except that in this case answers are written freehand on the surface of X-Y sensor 55, or another surface such as a piece of paper placed thereon. As writing proceeds, controller 1 repeatedly inputs the co-ordinates of the writing implement, and stores data representing the movement of the writing implement in memory 4. For best results, co-ordinates are read 100 times per second, and data is stored when the change of co-ordinates exceeds a predetermined threshold, thus reducing the amount of memory required. Other techniques of data compression, well known to the art, can be employed to minimise memory requirement. The timer values associated with each movement or group of movements occurring within a predetermined timeframe are also stored in memory 4. In use, this embodiment can employ one or more response cards, which are fitted to the X-Y sensing surface. An exemplary response card for use with this embodiment is shown in FIG. 6, The boxes printed onto these cards are of sufficient size to ensure that the written response will be sufficiently large to be clearly recorded, given the resolution of the X-Y sensing system. Each card can have printed upon it a series of boxes into which the player writes answers. As the answer is written, movements of the pen are recorded in memory 4, along with timing information. At the conclusion of a game, the response cards can be collected and scores calculated. To ensure that cheating has not occurred, the audience response recording devices used by potential winners can be connected to a computer which recalls the pen movements recorded, and displays a facsimile of what was written at the time of playing, along with the time and date of writing. This information can be displayed by a video display device, printer, facsimile machine or other means. If desired, handwriting analysis software can be applied to automatically score or check answers.

Figure 7:
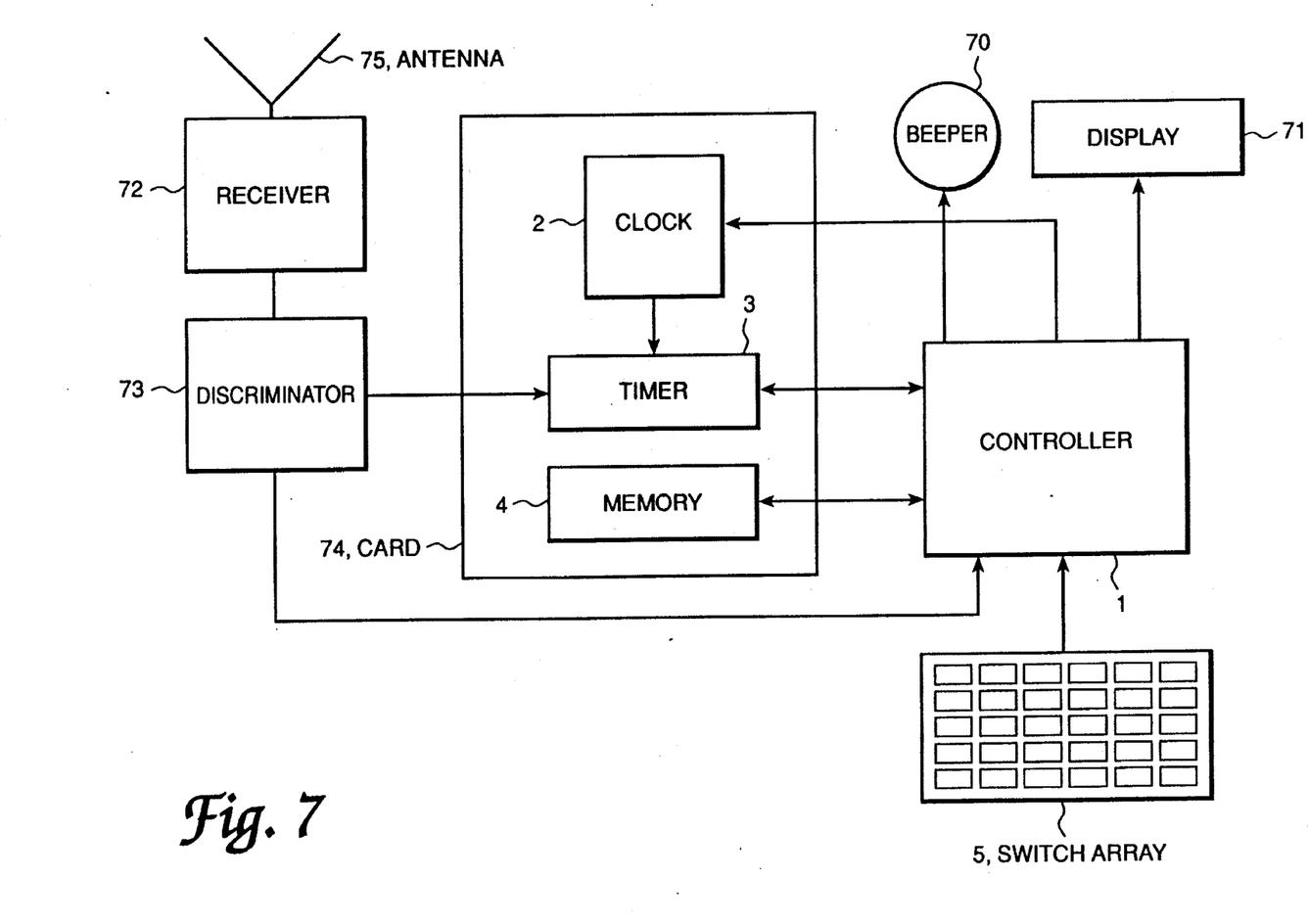
FIG. 7 is a block diagram of audience response means similar to that of FIG. 1 but including display and audible signalling means.

Another embodiment of the invention includes a number of optional features which can be incorporated to provide various operational advantages. An exemplary embodiment of the invention providing immediate automatic score calculation as well as other extensions is shown in FIG. 7. Referring to FIG. 7, this embodiment can be seen to be similar to that of FIG. 1 except that beeper 70, display 71, receiver 72, discriminator 73 and antenna 75 are also included. Beeper 70 is an acoustic signalling device, controlled by controller 1. Controller 1 is arranged so that beeper 70 is caused to sound with each successful recording of a response. This provides confidence that the apparatus of the invention is functioning when in use. Display 71 is a liquid-crystal display, also controlled by controller 1. Display 71 can be used for a number of purposes, such as indicating progress of a game by displaying a count of questions answered, displaying the selection made by a player, displaying elapsed time, displaying correct answers when play is complete, and displaying the player's score.

Receiver 72 receives signals containing response data and clock synchronizing information. Response data is data defining the correct answers to questions, and can be received before, during, or after questions are posed. Clock synchronizing information is a periodic time-of-day signal used to maintain accuracy of timer 3. Both types of signal are preferably formatted as serial digital signals using well known communication techniques. It is anticipated that these signals can originate from a variety of sources, including the television broadcasting station, another broadcasting station established expressly for this purpose, a broadcasting station providing radio-paging services, or other source. Although in this embodiment the signals are received off-air by antenna 75, it is envisaged that the signals can be conveyed via cable, or within the television broadcast signal itself, or by other means. Discriminator 73 discriminates between response data and clock signals, sending response data to controller 1 and clock signals to timer 3. Controller 1 is adapted to compare the response made by the player to the correct answer received from discriminator 73 and to accumulate a score value accordingly. If desired, different questions can also have different score values, these values being conveyed to the player's device as part of the response data.

The clock signals fed to timer 3 from discriminator 73 cause timer 3 to be set to the received time periodically, in this example once every minute. This ensures that the time values recorded are accurate, so that in this embodiment the procedure used in other embodiments for calculating absolute times from intervals recalled from the memory is not required. As the timing accuracy is high, the speed of responses to questions can be used to weight the value of correct answers if required. Having calculated the score, controller 1 can display the result on display 71. In a further extension of the concept, display 71 can be a printer or similar device for producing hard-copy output, thereby allowing coupons to be printed indicating that a prize has been won. Other forms of prize dispensing are also envisaged, such as production of a magnetically coded card.

Another feature of the embodiment of FIG. 7 is that clock 2, timer 3 and memory 4 are situated on a removable card (card 74 of FIG. 7). This arrangement allows the user to convey the card, rather than the whole device, to the place where responses are verified. This card can be constructed using well-known smartcard techniques.

According to a further useful variation of the invention, prevention of cheating can be achieved by equipping controller 1 to enable recording of responses only during predetermined time intervals. For example, if a viewer wishes to compete in a quiz show which is broadcast at 7.30 pm each day, for a duration of 30 minutes, values representing these times are stored in memory 4 at the time of sale of the device. At that time clock 2 is also enabled, and timer 3 is initialised to a predetermined value. Controller 1 then waits until timer 3 reaches the value corresponding to the time 7.30 pro, as stored in memory 4, at which time response recording is enabled. After 30 minutes, response recording is again inhibited. This can be repeated for a number of days if required. This embodiment of the invention is suited to use in cases where the rules of the game are such that the precise moment of response is not important, so long as the responses are made during the time of broadcast of the quiz. One advantage of this arrangement is that it is not necessary to store the timing information relating to each recorded response, thereby reducing the amount of data that must be stored.

According to another useful variation of the invention, the need to visit a central station for scoring or verification can be eliminated by providing means to communicate stored response and timing data to one or more central stations via a telephone network. For this purpose, the invention as described in any of the preceding embodiments can be adapted to communicate with a computer at a remote location at a time later than the recording of responses. For example, interface 6 of the embodiment shown in FIG. 1 can comprise a modem, acoustically coupled to a telephone instrument. An application of this embodiment is as follows. At the time of broadcast of a quiz show, the player enters responses using any method of the invention. The responses and timing information corresponding thereto are stored in the memory of the device according to the invention. At the conclusion of the programme, or some time later, the correct or preferred responses are published and each player scores his or her responses, using the written copy of the responses for reference. If the resulting score gives the player sufficient cause for optimism, the player can phone a central scoring station, and when so prompted, place the acoustic coupler of the invention (which can, for example, be beeper 70 of FIG. 7) against the telephone receiver. The player initiates a recall process, for example by pressing an appropriate button on the device. A computer equipped with modem at the scoring station then accepts the recalled response data and timing information. The current timer value is also transmitted from the device to the scoring computer via the telephone. The clock period used by the timer of the device can also be measured by the scoring computer, for example, by measuring the tone frequency received in the course of communication, the frequency having a known relationship to the clock frequency to be measured. Using a reference time and date, registered at the time of receiving the current timer value of the response recording device, the scoring computer computes from the timing values transmitted and, optionally, the clock period measured, the time and date of each response recorded. This computed information can be used to verify the claimed score. To ensure that one player does not register responses more than once, each recording device is preferably equipped with a unique identifying code, which is also transmitted to the scoring station.

According to another variation of the response gathering and scoring system of the preceding paragraph, the telephone network used for communication can be replaced by any other form of communication. For example, radio signalling can be used in a similar way. Such a scheme is advantageous in comparison to prior-art interactive response systems which use radio communication from viewers' stations to scoring stations in that the prior-art schemes require real-time communication from a large number of players to the scoring station, to guard against cheating, such communications means being complex and expensive if a large number of players are to be accommodated, whereas this embodiment of the present invention enables an unlimited number of players to participate, without requiring realtime response communication to provide timing information and eliminate cheating.

Another beneficial embodiment of the invention uses scratch-off ink techniques for receiving responses. Scratch-off ink is now widely used for lotteries and games, in which cases an opaque ink is printed over other information printed on a card, the objective being that that the player scratches off the opaque ink to reveal what is printed underneath. This technique can be beneficially applied to the present invention by replacing the answer cards previously described with scratch-off printed zones. For example, in the embodiment of FIG. 1, available responses to questions can be represented by scratch-off ink boxes printed on the surface of switch array 5. Indicia underneath these boxes indicate, for example, whether that box corresponds to a correct answer or not. When a player scratches off the box corresponding to the selected answer to a question, the switch underneath is activated, the selection and time being recorded as described previously and the indicium beneath being revealed.

Figure 8A:
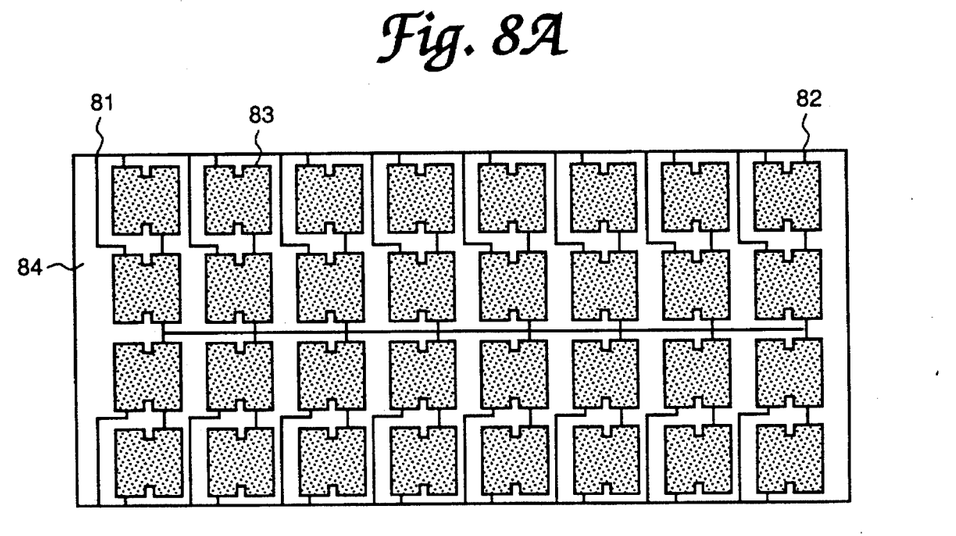
FIG. 8A and 8B show the circuit pattern of a response action sensor using scratch-off sensor pads.
Figure 8B:
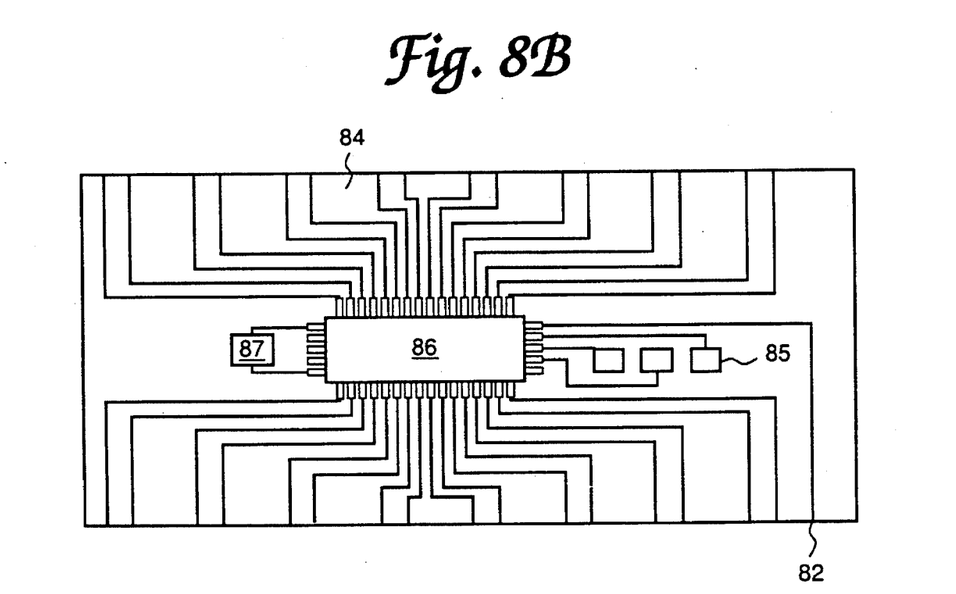

Another embodiment using scratch-off ink is described in FIGS. 8A to 10. In this embodiment, electrically-conductive scratch-off ink is used as the sensor means of the invention. Each zone of conductive ink is connected to sensing circuitry which detects the opening of the circuit if a zone is scratched off by the player, providing for example the function of switch array 5 of FIGS. 1 or 7. FIGS. 8A and 8B show the construction of this embodiment of the sensor means and electronic component assembly of this embodiment of FIGS. 8A and 8B respectively show the upper and lower surfaces of the printed circuit used to provide the scratch-off sensors and electrical connections to the electronic components. The circuit board (84) can for convenience be a thin flexible plastic film, printed on one side with conductive ink and folded so that the conductive pattern on the front forms the scratch-off zones and wraps around the edges to the back of the board where the components are mounted. In this embodiment, each conductive ink zone (83) is connected by a conductive ink line (81) to an integrated circuit (86) which contains the circuitry required to implement the functions of the invention. A connection common to all zones is also provided (82). A quartz crystal (87) is provided as the clock reference element. Contacts (85) are provided for data input and output functions.

Figure 9:
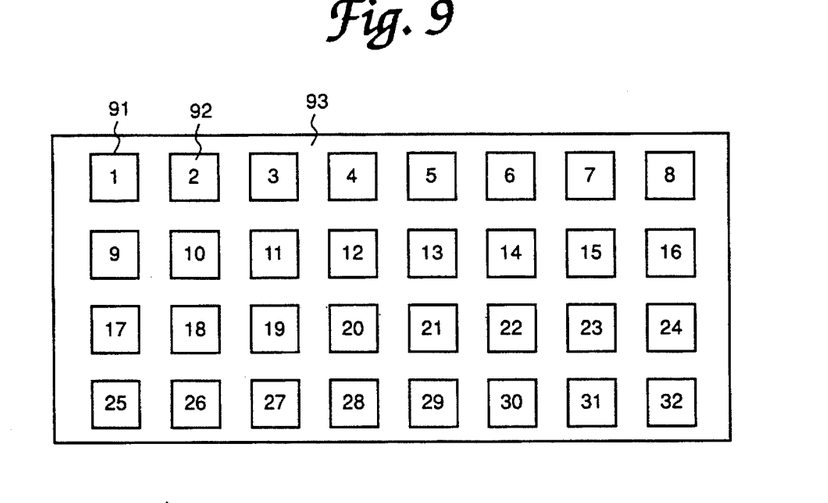
FIG. 9 shows the printed overlay of a response action sensor using scratch-off sensor pads.

Referring now to FIG. 9, the front surface of this embodiment of the invention in its completed form is seen. The scratch-off conductive ink zones (91) are overprinted with numbers or other indicia (92) to facilitate player selection. A further overprint (93) hides the interconnecting conductive lines.

Figure 10:
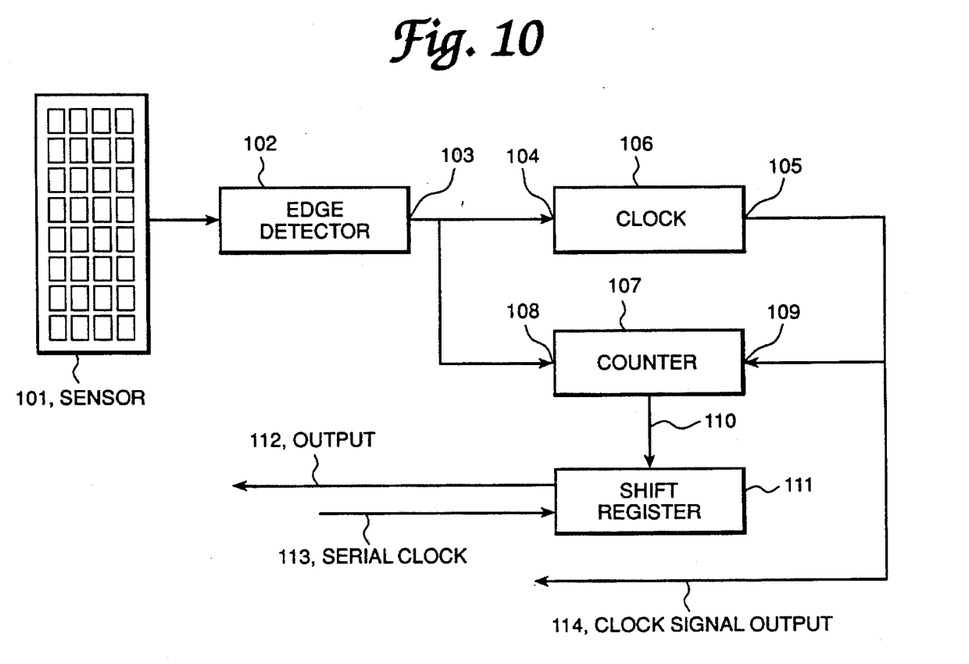
FIG. 10 is a schematic block diagram of an audience response system which stores the time of only one response.

Electronically, the function of this embodiment of the invention is similar to that of other embodiments except that audience responses are sensed by the opening of a circuit rather than the closing of a switch. One arrangement suitable for this adaptation is shown in schematic form in FIG. 10. This arrangement provides an audience response recording device adapted to record only the time of the last audience response action, rather than the time of each response as provided by other embodiments, such as that of FIGS. 1 and 7. As seen in FIG. 10, the sensor (101) is the conductive ink array of FIG. 8. Each zone of the array is connected to an edge detector (102), which detects a transition of any of the zones from closed circuit to open circuit and generates a pulse at its output (103). The clock (106) is a crystal oscillator and frequency divider which produces a 1 Hz output (105) when running. The clock is also arranged so that until a start pulse is received at its start input (104) the clock does not operate, to save battery power. When a zone is broken, by the player scratching off the ink, the edge detector (102) generates a pulse at its output (103) which causes the clock to start running. The clock output (105) feeds the clock input (109) of the counter (107), so that it begins counting seconds. The output of the edge detector (102) also feeds the reset input (108) of the counter, so that each time another zone of the sensor is open-circuited, the counter is reset. Accordingly, the instantaneous count value corresponds to the time elapsed since a zone was last scratched off. A parallel-in, serial-out shift register (111) serialises the count value for feeding to the serial data output (112) when required for computing the time at which the last response was made. A serial clock input (113) is provided to control recalling of the counter value, and a clock signal output (114) is provided to enable measurement of the clock frequency for use in calculating relative times. If desired, this embodiment of the invention can be further simplified by eliminating the shift register (111) and using an up-down counter as the counter (107), in which case the time value stored in the counter is read out by clocking the down-count input of the counter and counting the number of clock pulses required to reach a count of zero.

The arrangement of FIG. 10 is particularly useful in the case of games where it is important to confirm that responses were made before a given time, for example before answers were broadcast or otherwise published, and where it is not necessary to know at what time the first response or subsequent individual elements of the response were made. Although described herein with reference to an embodiment of the invention using scratch-off sensor means, the technique is equally applicable to use with other sensor means. In the case of an embodiment of the invention using this arrangement with other sensor means, there is a risk of accidental activation of the sensor after completion of the game, which might cause the play to be invalidated. This problem can be avoided by providing suitable lockout means, such as a rigid cover which is clipped into position after play to prevent accidental operation of the sensor.

The foregoing describes only some embodiments of the invention, and modifications obvious to those skilled in the an can be made without departing from the scope of the invention. For example, whereas certain embodiments described are arranged so that the timing means begins running when a first response is sensed, it is envisaged that the timing means could operate continuously from, for example, the time of sale of the device, or the time of insertion of batteries. In this case, it is possible to arrange the invention so that a display device, if used, would display information such as the current time and date and time and date of the next quiz show to be broadcast. If a beeper is provided, it can be caused to sound at a predetermined time to alert viewers to the impending commencement of a quiz show in which they wish to participate. The means for recalling stored responses and timing information described in relation to the embodiments above is also only one example of suitable means and method. For example, if the timing means is set to a predetermined value at a time prior to the quiz taking place, such as at the time of sale of the device, the times recalled after responses have been recorded can be read as absolute times, or calculated relative to the time at which the timer was set. It is also envisaged that alternative methods of recalling information can be used in lieu of interface 6 of the embodiments described above. For example, a simpler embodiment can be constructed without interface 6, being arranged so that responses are recorded during time windows determined by entering a predetermined series of depressions on the switch array; the responses being recalled via a liquid-crystal display device upon entering a predetermined series of depressions on the switch array. It is also envisaged that the invention can be realised using a wide range of alternative response-sensing means, for example by using push-button switches to record responses. One such realization can comprise only two push-buttons, used to answer yes or no to questions posed. It is further envisaged that for the purpose of automatic scoring the correct answers to questions can be stored in the memory of the invention at a time prior to the audience response, for example by storing suitable data in non-volatile memory means before purchase, the invention being arranged so that these answers cannot be accessed by players until the game is over. The scope of the invention is also not restricted to the use of manual actions for recording audience responses; other actions can be sensed and recorded, for example, verbal answers can be received and stored in digitised form. Furthermore, although embodiments of the invention are described herein as being practised using discrete electronic elements, a variety of other techniques can be used with good results. For example, the functions required can be economically achieved using a suitably-programmed microprocessor or an application-specific integrated circuit.

INDUSTRIAL APPLICABILITY

The present invention provides an economical and effective scheme for gathering responses from audiences of unlimited size and for determining retrospectively the time at which the responses were made. One application of the invention is in providing a television quiz show in which viewers can participate.

I claim:

1. A method of gathering and evaluating responses made by individual members of an audience to a group of questions posed, said method comprising the steps of:

for each of a group of questions posed, inviting members of the audience to select a response from a set of possible responses, sensing a response made by a responding member of an audience, storing, in a memory located in close proximity to the responding member of the audience and unique to that member, a response value identifying which response in said set of possible responses is sensed, and storing, in said memory, a time value derived from a timer, said value corresponding to a time at which the response is sensed;

and, for each response sensed, recalling said response value from said memory, recalling said time value from said memory, comparing said recalled response value to a predetermined value representative of a preferred response to obtain a first comparison result, accumulating a score according to a result of said first comparison result, calculating, using said recalled time value, a response time, comparing said calculated response time to a predetermined range of time values within which responses are considered valid to obtain a second comparison result, and providing an indication that a response is not valid if said second comparison result indicates that said response time is not valid and providing an indication that a response is valid if said second comparison result indicates that said response time is valid.

2. A method according to claim 1 comprising the step of issuing a coupon bearing data representative of said recalled response values and said recalled time values.

3. A method of gathering and evaluating responses made by individual members of an audience to a group of questions posed, said method comprising the steps of:

for each of a group of questions posed, inviting members of the audience to select a response from a set of possible responses, recording, by means of visible marking of a surface located in close proximity to a responding member of the audience and unique to that member, at least one response selected from said set of possible responses, sensing the recording of said marking on surface, and storing, in a memory physically attached to said surface, a time value derived from a timer corresponding to a time at which the at least one response is sensed;

and, comparing said recorded at least one response to a predetermined set of preferred responses, to obtain a first comparison result, calculating a score according to a result of said first comparison, result, recalling from said memory a time value, calculating a response time, using said recalled time value, comparing said calculated response time to a predetermined range of time within which responses are considered valid to obtain a second comparison result, and providing an indication that a response is not valid if said second comparison result indicates that said recalled value is not valid and not providing an indication that a response is valid if said second comparison result indicates that said recalled value is valid.

4. A method of gathering and evaluating responses made by individual members of an audience to a group of questions posed, said method comprising the steps of:

for each of a group of questions posed, inviting members of the audience to select a response from a set of possible responses, sensing a response made by a responding member of the audience, sensing from a timer a current time value, and comparing said current time value to a predetermined range of values defining valid times and if the current time value is a valid time value, storing, in a memory located in close proximity to the responding member of the audience and unique to that member, a value identifying which response in said set of possible responses is sensed;

and, for each response sensed, recalling from said memory said stored value, comparing said recalled value to a predetermined value representative of a preferred response to obtain a comparison result, and accumulating a score according to a result of said comparison result.

5. A method of gathering and evaluating responses made by individual members of an audience to a group of questions posed, said method comprising the steps of:

for each of a group of questions posed, inviting a responding member of the audience to respond by using a suitable instrument to mark a prescribed surface, periodically sensing a position of said instrument relative to said surface, storing, in a memory located in close proximity to the responding member of the audience and unique to that member, a series of co-ordinate data corresponding to a position of said instrument at each period, storing, in said memory, a time value derived from a timer corresponding to a time at which a response is sensed;

and, for each response sensed, recalling said series of co-ordinate data from said memory, displaying an image corresponding to said series of co-ordinate data, comparing said displayed image to a predetermined image representative of a preferred response to obtain a first comparison results, accumulating a score according to a result of said first comparison result, recalling said time value from said memory, calculating a response time, using said recalled time value, comparing said calculated response time to a predetermined range of time values within which responses are considered valid to obtain a second comparison result, and providing an indication that a response is not valid if said second comparison result indicates that said recalled value is not valid and providing an indication that a response is valid if said second comparison result indicates that said recalled value is valid.

6. A method according to claims 1, 3 or 5 wherein the value corresponding to the time at which the response is sensed is a number of time units which do not correspond directly to one of a time of day and a date but are time units indicating times of responses relative to each other and the step of calculating a response time comprises the substeps of:

accessing the timer from which the time value originated;

reading from said timer a value corresponding to a current total time value;

subtracting the time value recalled from said memory from said current total time value to give a relative time value corresponding to a relative time between the sensed response and a current time;

measuring an absolute time period of the signal used to clock the timer;

multiplying said relative time value by said absolute time period to give an absolute elapsed time value; and subtracting said absolute elapsed time value from a current time and date to yield an absolute response time.

7. A method according to one of claims 1–5 and further comprising the steps of:

receiving a clock synchronizing signal; and synchronizing said timer to said received signal.

8. A method according to one of claims 1–4 and further comprising the steps of:

receiving a response signal containing data indicating preferred responses; and converting said response signal into a form suitable for use as said predetermined value representative of a preferred response.

9. A method according to claim 1 or claim 4 wherein the step of sensing a response made by a member of the audience comprises the step of detecting a breaking of a circuit formed by a zone of conductive ink.

10. A method according to claim 1 or claim 4 wherein the step of sensing a response made by a member of the audience comprises the step of detecting a pressure of a writing implement writing on a writing surface.

11. A method according to claims 1, 3 or 5 comprising the step of issuing a coupon if a predetermined score is achieved and a time of response corresponding to each response is valid.

12. A method according to claim 4 comprising the step of issuing a coupon if a predetermined score is achieved.

13. A method according to claim 4 comprising the step of issuing a coupon bearing data representative of said recalled values.

14. Apparatus for gathering and evaluating responses made by individual members of an audience to a group of questions posed, said apparatus comprising:

electronic timer means for measuring a time period;

means for sensing a response made by a responding member of an audience;

memory means located in close proximity to the responding member of the audience and unique to that member;

recording means for storing in said memory means a response value identifying which response in said set of possible responses is sensed and a time value derived from said timer means;

scoring means for each response sensed,
recalling said response value from said memory means, comparing said recalled response value to a predetermined value representative of a preferred response to obtain a first comparison result, and
accumulating a score according to the result of said first comparison result;

means for recalling said time value from said memory means for each response sensed;

a calculator calculating a response time for each said recalled time and;

validation means for each response sensed,
comparing said calculated response time to a predetermined range of time values within which responses are considered valid to obtain a second comparison result, and
providing an indication that a response is not valid if said second comparison result indicates that said recalled value is not valid and providing an indication that a response is valid if said second comparison result indicates that said recalled value is valid.

15. Apparatus according to claim 14 and further comprising means for issuing a coupon bearing data representative of said recalled response values and said recalled time values.

16. Apparatus according to claim 15 wherein data borne by the coupon comprises at least data which is machine-readable and cannot be read by a person without aid of a machine.

17. Apparatus according to claim 15 wherein data borne by the coupon comprises at least indicia which can be read by a person without aid of a machine.

18. Apparatus according to claim 14 wherein said sensing means, memory means and recording means are located at a first geographical location and said scoring means, calculator and validation means are located at a second geographical location and further comprising communication means for communicating said recalled time values and response values and from said first geographical location to said second geographical location.

19. Apparatus according to claim 18 wherein said communication means comprises memory means capable of being disconnected from the apparatus at said first location, conveyed to said second location, and connected to the apparatus at said second location.

20. Apparatus for gathering and evaluating responses made by individual members of an audience to a group of questions posed, said apparatus comprising:

a surface generating a response output if pressure is applied by a writing instrument being used to write upon said surface;

memory means physically attached to said surface for calculating and for storing information;

electronic timer means for measuring a time period;

controller means for storing in said memory means a value derived from said timer means corresponding to a time at which said response output is generated;

recall means for recalling said time value from said memory means for each response output generated;

a calculator calculating a response time for each said recalled time value; and validation means for each response sensed,
comparing said calculated response time to a predetermined range of time values within which responses are considered valid, and
providing an indication that a response is not valid if said comparing step indicates that said recalled value is not valid and providing an indication that a response is valid if said comparing step indicates that said recalled value is valid.

21. Apparatus for gathering and evaluating responses made by individual members of an audience to a group of questions posed, said apparatus comprising:

electronic timer means for measuring a time period;

means for sensing a response made by a responding member of an audience; and controller means for sensing from said timer means a current time value and for comparing said current time value to a predetermined range of values defining valid times, and if the current time is a valid time, storing, in memory means located in close proximity to the responding member of the audience and unique to that member, a value identifying which response in said set of possible responses is sensed.

22. Apparatus according to claim 21 and further comprising scoring means for each response sensed, recalling from said memory means said stored value, comparing said recalled value to a predetermined value representative of a preferred response, and accumulating a score according to a result of said comparison.

23. Apparatus according to claim 21 or 22 and further comprising means for issuing a coupon bearing data if a predetermined score is achieved.

24. Apparatus according to claim 23 wherein data borne by the coupon comprises at least data which is machine-readable and cannot be read by a person without aid of a machine.

25. Apparatus according to claim 13 wherein data borne by the coupon comprises at least indicia which can be read by a person without aid of a machine.

26. Apparatus according to claim 21 or 22 and further comprising means for issuing a coupon bearing data representative of said recalled values.

27. Apparatus according to claim 26 wherein data borne by the coupon comprises at least data which is machine-readable and cannot be read by a person without aid of a machine.

28. Apparatus according to claim 26 wherein data borne by the coupon comprises at least indicia which can be read by a person without aid of a machine.

29. Apparatus according to claim 21 or 22 wherein said sensing means and controller means are located at a first geographical location and said scoring means is located at a second geographical location and further comprising communication means for communicating said recalled values from said first geographical location to said second geographical location.

30. Apparatus according to claim 29 wherein said communication means comprises memory means capable of being disconnected from the apparatus at said first location, conveyed to said second location, and connected to the apparatus at said second location.

31. Apparatus for gathering and evaluating responses made by a responding member of an audience to a group of questions posed, said apparatus comprising:

a writing surface equipped with co-ordinate outputs indicating a position of a writing instrument on it;

means for periodically sampling said co-ordinate outputs;

memory means located in close proximity to the responding member of the audience and unique to that member;

means for storing, in said memory means, said periodically-sampled co-ordinate data, corresponding to the position of said instrument at each sample period, as a series of co-ordinate data;

means for storing, in said memory means, a time value derived from timer means for measuring a time period, said time value corresponding to a time at which a response is sensed;

recalling and displaying means for recalling said series of coordinate data from said memory means and for displaying an image corresponding to said series of co-ordinate data;

means for recalling said time value from said memory means for each response sensed;

a calculator calculating a response time for each said recalled time value; and validation means for each response sensed,
comparing said calculated response time to a predetermined range of time values within which responses are considered valid; and providing an indication that a response is not valid if said comparing step indicates that said recalled value is not valid and providing an indication that a response is valid if said comparing step indicates that said recalled value is valid.

32. Apparatus according to claim 31 wherein said writing surface, and said sampling means, memory means, and storing means are located at a first geographical location and said recalling means and displaying means is located at a second geographical location and further comprising communication means for communicating said recalled values from said first geographical location to said second geographical location.

33. Apparatus according to claim 32 wherein said communication means comprises memory means capable of being disconnected from the apparatus at said first location, conveyed to said second location, and connected to the apparatus at said second location.

34. Apparatus according to claims 14, 20 or 31 wherein the value corresponding to the time at which the response is sensed is a number of time units which do not correspond directly to a time of day and date but are time units indicating times of responses relative to each other and said response time calculator:

accesses the timer means from which the time value originated;

reads from said timer means a value corresponding to a current total time value;

subtracts the time value recalled from said memory means from said current total time value to give a relative time value corresponding to a relative time between the sensed response and a current time;

measures the absolute time period of a signal used to clock the timer means;

multiplies said relative time value by said absolute time period to give an absolute elapsed time value; and subtracts said absolute time value from the current time and date to yield an absolute response time.

35. Apparatus according to one of claims 14–22 and further comprising:

a clock synchronizing signal receiver; and means for synchronizing said timer means to the output of said clock synchronizing signal receiver.

36. Apparatus according to one of claims 14–22 and further comprising:

a receiver adapted to receive signals containing data indicating preferred responses; and means for converting said signals into a form suitable for use as said predetermined value representative of a preferred response.

37. Apparatus according to claims 14, 21 or 22, wherein the means for sensing a response made by a responding member of the audience comprises a non-conductive sheet onto which is printed a number of zones of conductive ink, said zones being connected to sensing means for sensing a breaking of contact when a response is made by removing one of said zones.

38. Apparatus according to claims 14, 21 or 22 wherein the means for sensing a response made by a responding member of the audience comprises a surface producing an electrical signal responsive to pressure of a writing implement writing upon a detachable writing surface placed thereon.

39. Apparatus according to claim 14 or claim 15 and further comprising means for issuing a coupon if a predetermined score is achieved and a time of response corresponding to each response is valid.

40. Apparatus for gathering and evaluating responses made by individual members of an audience, said apparatus comprising:
   means for sensing a response made by a responding member of the audience;
   memory means located in close proximity to the responding member of the audience and unique to that member,
   recording means for storing in said memory means a response value identifying which response in a set of possible responses is sensed;
   a periodic clock pulse generator;
   a counter counting count said periodic clock pulses;
   reset means for resetting said counter to a predetermined value when an audience response is sensed;
   scoring means for, for each response sensed,
      recalling said response value from said memory means,
      comparing said recalled response value to a predetermined value representative of a preferred response, to obtain a first comparison result, and
      accumulating a score according to a result of said first comparison result;
   a calculator:
      receiving a count value from said counter,
      measuring the period of said periodic clock pulse generator,
      multiplying said count value by said clock period to give an elapsed time value, and
      subtracting said elapsed time value from the current time and date to yield an absolute time value corresponding to the absolute time of last response;
   validation means for:
      comparing said calculated absolute time value to a predetermined range of time values within which responses are considered valid to obtain a second comparison result; and
      providing an indication that a response is not valid if said second comparison result indicates that said recalled value is not valid and providing an indication that a response is valid if said second comparison result indicates that said recalled value is valid.

41. Apparatus for gathering said evaluating responses made by individual members of an audience comprising:
   means for sensing a response made by a responding member of the audience comprising a number of zones of conductive ink printed on a non-conductive surface;
   memory means located in close proximity to the responding member of the audience and unique to that member;
   a periodic clock pulse generator;
   a counter counting said periodic clock pulses;
   a detector generating a response signal when electrical conductivity of one of said zones is broken;
   reset means for resetting said counter to a predetermined value when said detector generates a response signal;
   a calculator for
      receiving a count value from said counter,
      measuring a period of said periodic clock pulse generator,
      multiplying said count value by said clock period to give an elapsed time value, and
      subtracting said elapsed time value from the current time and date to yield an absolute time value corresponding to an absolute time of last response and;
   validation means for
      comparing said calculated time value to a predetermined range of time values within which responses are considered valid, to obtain a first comparison result, and
      providing an indication that a response is not valid if said first comparison result indicates that said recalled value is not valid and providing an indication that a response is valid if said first comparison result indicates that said recalled value is valid.

42. Apparatus according to claim 41 and further comprising scoring means for:
   forming a response value according to which ones of said zones are broken;
   comparing said recalled response value to a predetermined value representative of a preferred response; and
   calculating a score according to a result of said comparison.

43. Apparatus for gathering and evaluating responses made by individual members of an audience comprising:
   a surface generating a response output if pressure is applied by a writing instrument being used to write upon said surface;
   a periodic clock pulse generator;
   a counter counting said periodic clock pulses;
   reset means for resetting said counter to a predetermined value when said response output is sensed;
   a calculator for:
      receiving a count value from said counter,
      measuring a period of said periodic clock pulse generator,
      multiplying said count value by said clock period to give an elapsed time value, and
      subtracting said elapsed time value from a current time and date to yield a time value corresponding to a time of last response; and
   validation means for:
      comparing said calculated time value to a predetermined range of time values within which responses are considered valid, and
      providing an indication that a response is not valid if said comparison indicates that said recalled value is not valid and providing an indication that a response is valid if said comparison indicates that said recalled value is valid.

* * * * *